United States Patent [19]

Buchholz et al.

[11] Patent Number: 5,337,313
[45] Date of Patent: Aug. 9, 1994

[54] METHOD AND APPARATUS FOR PRESERVING PACKET SQUENCING IN A PACKET TRANSMISSION SYSTEM

[75] Inventors: Dale R. Buchholz, Palatine; William K. Doss, Lake In The Hills; Karen E. Robbins; Mark A. Yednak, both of Lake Zurich; R. Lee Hamilton, Jr., Palatine, all of Ill.

[73] Assignee: Motorola, Inc., Schaumburg, Ill.

[21] Appl. No.: 975,360

[22] Filed: Nov. 12, 1992

[51] Int. Cl.$^5$ .............................................. H04L 12/56
[52] U.S. Cl. .................................................. 370/94.1
[58] Field of Search ...................... 370/60, 94.1, 94.2, 370/60.1, 85.13, 85.14, 92; 371/67.1, 60, 32, 57.1, 57.2; 340/825.06, 825.07, 825.52

[56] References Cited

U.S. PATENT DOCUMENTS

| | | | |
|---|---|---|---|
| 4,251,885 | 2/1987 | Dodt et al. | 371/60 |
| 4,999,834 | 3/1991 | Leo et al. | 370/94.1 |
| 5,086,428 | 2/1992 | Perlman et al. | 370/94.1 |
| 5,168,497 | 12/1992 | Ozaki et al. | 370/94.1 |

OTHER PUBLICATIONS

"Computer Networks", by Andrew S. Tanenbaum, Prentice–Hall, Inc. Englewood Cliffs, New Jersey 07632, Chapter 4, pp. 136–186, 1981.

*Primary Examiner*—Douglas W. Olms
*Assistant Examiner*—Ajit Patel
*Attorney, Agent, or Firm*—Val Jean F. Hillman

[57] ABSTRACT

A method and apparatus for preserving the sequential relationship of a plurality of data packets 310 generated by separate source devices 14 and ordered as a data stream 300, despite transmission over radio channels which introduce ordering errors comprises method steps and apparatus structure for identifying at a first terminal, data packets from within the data stream as a function of source, generating data packet sequence information for identified data packets, storing values corresponding to data packet sequence numbers as a function of source and transmitting data packets, source device identity and packet sequence information to a second terminal having first terminal source device and data packet sequence information. Upon receipt of a first terminal transmission, the second terminal retrieves from second terminal memory, first terminal data packet sequence information and compares the stored data packet sequence information with received data packet sequence information. As a function of the comparison, received data packets are forwarded to an appropriate application for further processing when sequence information sequence numbers compare and stored in an order determined by the sequence information when the sequence numbers do not compare.

21 Claims, 7 Drawing Sheets

TABLE 3

| LOWER WINDOW BOUND | Rx WINDOW MAP | Rx WINDOW QUEUE PTR |
|---|---|---|
| A | 0 | 2 |
| D | 7 | 4 |
| C | 2 | 1 |
| O | 8 | 3 |
| E | 4 | 1 |

TABLE 2

| | V(s) | LOWER WINDOW BOUND | Tx WINDOW MAP | V(r) | Rx WINDOW MAP | Rx WINDOW QUEUE PTR |
|---|---|---|---|---|---|---|
| 0 | | | | | | |
| 1 | | | | | | |
| 2 | | | | | | |
| 3 | | | | | | |
| 4 | X | X | X | X | X | X |
| 5 | X | X | X | X | X | X |
| | X | X | X | X | X | X |

METHOD AND APPARATUS FOR PRESERVING PACKET SQUENCING IN A PACKET TRANSMISSION SYSTEM

FIELD OF THE INVENTION

This invention is generally directed to a radio frequency (RF) packet transmission system in which data is transmitted by packets and is specifically directed to a method and apparatus which preserves data stream packet sequencing.

BACKGROUND OF THE INVENTION

Businesses which have adopted RF Local Area Networks (LAN) transmit data using RF communications. FIG. 1 illustrates a typical RF packet transmission system comprising a wireless LAN in which control module (CM) 10 utilizes RF communications to communicate with a plurality of user modules (UM) 12. Each UM 12 is connected to one or more user devices 14 such as a terminal, personal computer or other information input/output device via connection 16. The CM 10 is connected to data network 18 by data channel 20 which may include, but is not limited to wires or optical links.

The CM 10 controls communications within the illustrated network and passes information from data network 18 to user devices 14 via an associated UM 12. The CM 10 also controls local communications by receiving information from one UM 12A and relaying the information to a different UM 12B. Data network 18 may consist of an Ethernet network, a Token Ring network, or any of the other of the well known data networks.

In the packet transmission system of FIG. 1, information such as the information passed between UM 12 and a user device 14 or between CM 10 and data network 18, is conveyed in the form of data packets multiplexed into a data stream. Wireless information such as the information transmitted between UMs 12 and CM 10, is conveyed in the form of radio transmission packets. Each radio transmission packet typically contains a preamble and an information field. The preamble may comprise control data, synchronization information and/or destination device information. The information field contains at least some of the information comprising a data packet.

By way of example, assume two terminal devices 14 serviced by a common UM 12 transmit an equal number of packets, N/2, over wire 16. Further assume that N is 10. Then each terminal device 14 connected to UM 12 will transmit 5 packets which collectively combine to create the multiplexed data stream 300 of FIG. 3.

Continuing with this example, a first terminal device 14, designated as terminal A, transmits 5 packets numbered 0-4, while a second terminal 14, designated as terminal B, transmits 5 packets numbered 0-4. When transmitted over the wire 16, these 10 packets A0-A4 and B0-B4 are typically interspersed in a random nature, such as: B0,B1,A0,B2,A1,A2,A3,B3,A4,B4. While the data stream ordering appears completely random, it will be noticed upon closer inspection that this ordering is actually pseudorandom, for data packets A0-A4 and B0-B4 maintain their original and sequential order with respect to the source devices A and B, respectively. Consequently, packet A0 will always precede packets A1-A4 in ascending order while packet B0 will always precede packets B1-B4 in the same ascending order.

It will of course be appreciated by those skilled in the art that the preceding discussion is presented, in part, for illustrative purposes. Any number of terminal devices 14 can be serviced by UM 12. The number of data packets transmitted by those terminal devices may vary. Moreover, the data stream length N can be any number of data packets. Despite these variances, data stream packets maintain a sequential relationship (0,1,2,3, . . . , N) with respect to their source or point of origin.

During the transmission of radio transmission packets that convey data stream packets between UMs 12 and CM 10, it is extremely likely that the data stream packet order will change as a result of RF anomalies such as multipath reception and radio interference. This is especially true of the in-building office environment envisioned by the packet transmission system of FIG. 1. In such an environment, RF anomalies may result in lost, delayed or unintelligible radio transmission packets. As received by CM 10, a reconstructed data stream may only comprise, for example, data packets A1,B0,A4,B-3,A2,B4,A0,B1,B2.

Where packet data network 18 of FIG. 1 employs data messaging protocols capable of handling reordered data packets, the reconstructed data stream A1,B-0,A4,B3,A2, B4,A0,B1,B2 may be transmitted over channel 20 for further processing. If, on the other hand, packet data network 18 employs data messaging protocols which are catastrophically sensitive to the receipt of data packets from a terminal device 14 which no longer have their original sequentially ordered relationship (A0-A4 or B0-B4), successful processing and ultimately system operation will fail.

Examples of data messaging protocols which are catastrophically sensitive to the receipt of reordered data packets include, but are not limited to:
High Level Data Link Control (HDLC);
Link Access Protocol-B (LAP B);
Link Access Protocol-D (LAP D);
Logical Link Control II (LLC II); and
Synchronous Data Link Control (SDLC).

While the prior art suggests that lost and/or corrupted radio transmission packets can be retransmitted, the incident delays adversely impact system throughput. This is especially true where multiple users devices 14 are supported by a single UM 12. Since the above mentioned data messaging protocols are widely used in the field of data communications, it would be extremely advantageous to provide a method whereby lost, unintelligible, or delayed radio transmission packets associated with a specific user device 14 do not interrupt service to the other devices 14 supported by the common UM 12.

SUMMARY OF THE INVENTION

Briefly described, the present invention is a method and apparatus for preserving the sequential relationship of a plurality of data packets, generated by separate source devices and ordered as a data stream, despite packet transmission over a radio channel that is subject to radio interference and therefore may introduce data stream ordering errors. Method steps and apparatus structure is provided for identifying data packets from within the data stream as a function of source device identification information, generating data packet sequence information for the identified data packets, storing in memory, values corresponding to the data packet sequence information, and then transmitting the data packets, the source device identification information and the data packet sequence information to said second terminal having first terminal source device and data packet sequence information. At a second terminal method steps and apparatus structure are provided for receiving said first terminal transmissions, fetching from second terminal memory, first terminal data packet sequence information as a function of first terminal source device identification information, and comparing the fetched data packet sequence information with the received data packet sequence information. As a function of the comparison, received data packet are forwarded for further processing when sequence information sequence numbers compare and are stored in an order determined by the sequence information when sequence numbers do not compare.

DETAILED DESCRIPTION OF A PREFERRED EMBODIMENT

Before describing a particular embodiment of the present invention, it is believed that an initial overview will aid the reader's understanding. The problems identified in handling packets in an RF packet transmission system are reduced, by the present invention which allows received data packets to be addressed into memory in accordance with a hierarchy of addressability associated with the address of a specific user device 14. The disclosed memory mapping permits data stream reconstruction on a user device-by-user device basis, such that a lost, unintelligible, or delayed radio transmission packet associated with one of a plurality of user devices does not interrupt service to the other devices supported by a common UM 12.

Figure 2:
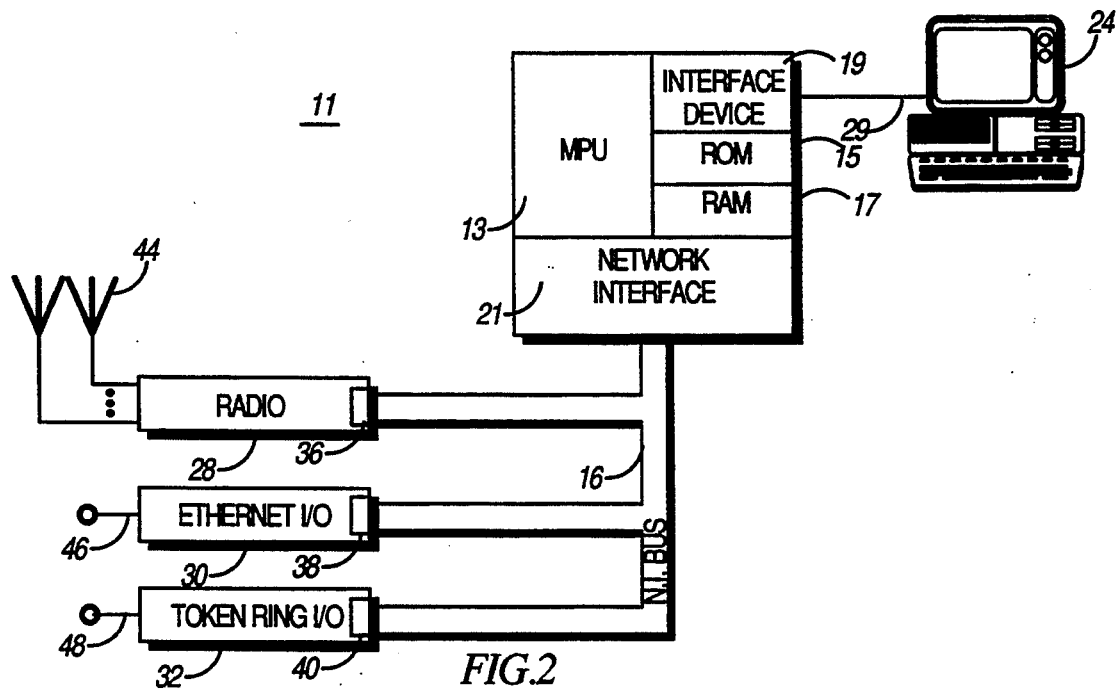
FIG. 2 is a block diagram of a UM or a CM as shown in FIG. 1.

Referring to FIG. 2, a typical block diagram configuration of a UM 12 or CM 10 is illustrated. A communications controller 11 includes a microprocessor 13, with associated read only memory (ROM) 15, random access memory (RAM) 17, serial interface device 19, and network interface 21. The serial interface device 19 consists of appropriate registers and line drivers for communication with a terminal device 24 connected to the UM by communications bus 29. In accordance with the preferred embodiment the interface device 19 is an RS232 interface, serial bus 29 is an RS232 bus and I/O device 24 may be any of the well known asynchronous RS232 terminals capable of providing a serial I/O function. While depicted as a permanent connection, terminal device 24 is only connected as shown during various administrative and maintenance operations requiring direct I/O to and from UM 12. The network interface 21 consists of appropriate registers and line drivers for communication with the plurality of peripheral devices connected by network interface (NI) bus 16.

According to the physical structure of FIG. 2, a plurality of peripheral devices including two-way RF radio 28, Ethernet I/O device 30, and Token Ring I/O device 32 are interfaced with UM 12. Each peripheral 28–32 contains a NI bus interface 36, 38, and 40, respectively. These interfaces provide the necessary registers and line drivers for communicating on NI bus 16 and will also include a microprocessor, RAM, and ROM if these resources are not available in the integrated devices.

Figure 1:
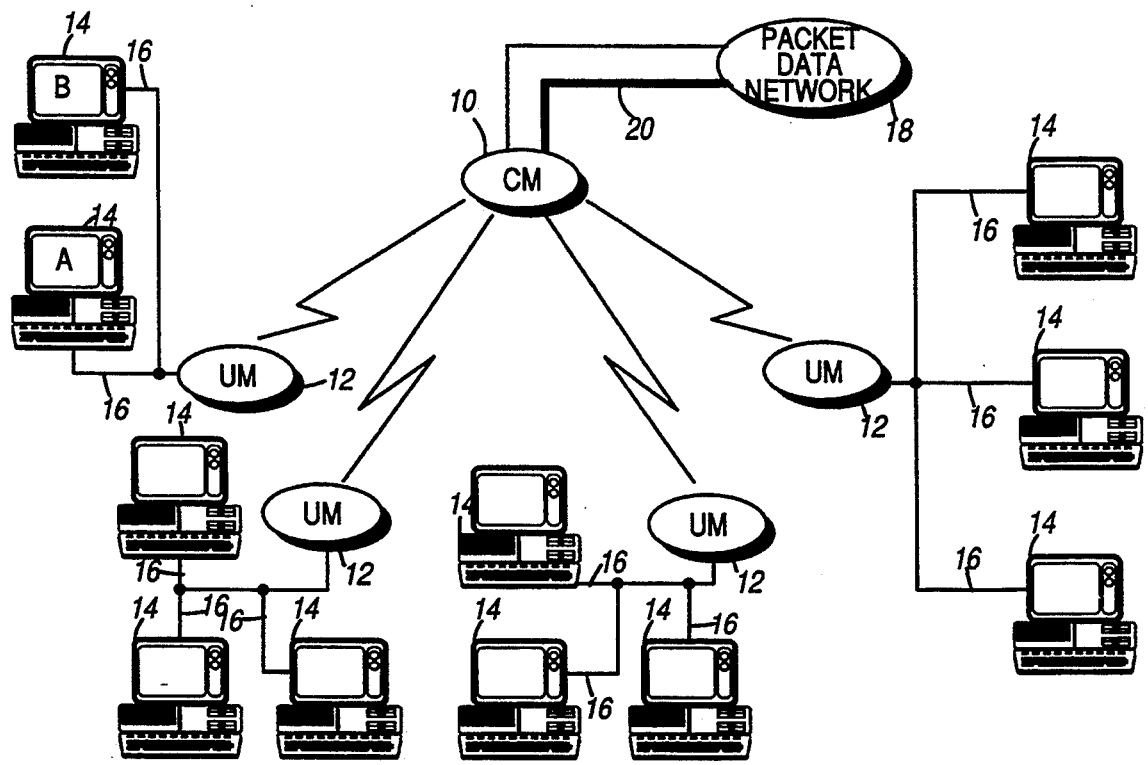
FIG. 1 is a block diagram of an exemplary RF packet transmission system.

As depicted, radio 28 includes one or more antennas designated 44 for RF communication between UM 12 and CM 10 as shown in FIG. 1. As previously mentioned, wireless information is communicated via transmission packets as discussed in association with FIG. 3. Continuing, Ethernet I/O device 30 is coupled by wire 46 to a conventional Ethernet port. Likewise the Token Ring I/O device 32 is coupled by wire 48 to a conventional Token Ring network. The illustrated peripherals are merely representative that virtually any type of packetized information can be coupled by means of an appropriate input/output device to UM 12.

While the preferred embodiment shows NI bus 16 connecting the various peripherals together via the communications controller 11, it will be appreciated by those skilled in the art that the NI bus 16 can be substituted by a time division multiplexed (TDM) bus, bi-directional buses or a packet switch.

Figure 3:
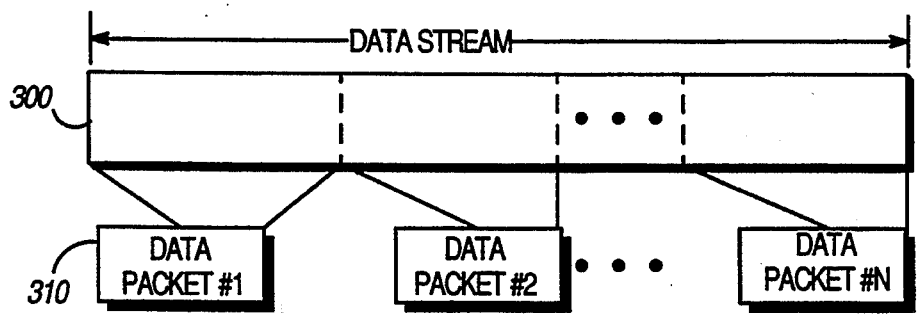
FIG. 3 illustrates the correspondence between a data stream and a plurality of data packets.

As previously mentioned, FIG. 3 illustrates the correspondence between data stream 300 and a plurality of multiplexed data packets 310. As depicted, the data stream 300 comprises data packets 310 numbered 1−N. Each data packet comprises a destination address, a source address and source device message information.

Figure 4:
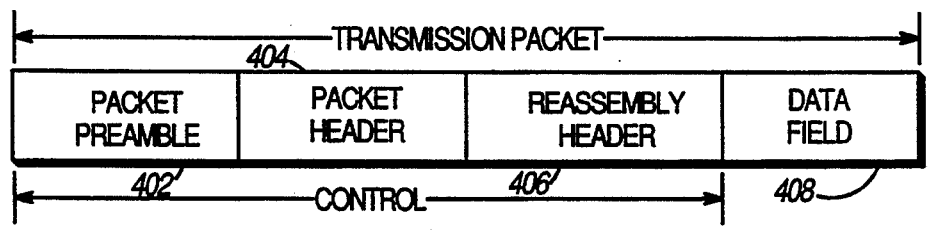
FIG. 4 illustrates the correspondence between a data packet and radio a transmission packet.

FIG. 4 illustrates a transmission packet 400 which is transmitted over RF channels between CM 10 and UMs 12. The format illustrates the transmission of control information comprising packet preamble information 402, packet header 404 and reassembly header 406, as well as data field 408 which may contain a data packet 310. The packet preamble 402 is provided for radio 28 synchronization purposes. The packet header 404 and the reassembly header 406 will be explained in more detail below.

Figure 5:
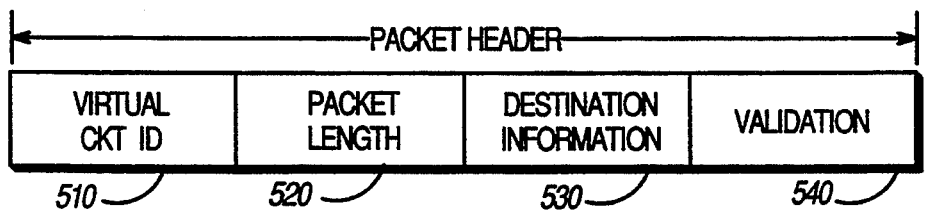
FIG. 5 illustrates the information contained in the packet header as shown in FIG. 4.

FIG. 5 illustrates the information contained within the packet header as shown in FIG. 4. The packet header includes virtual circuit identification field (VCID) 510, packet length information 520, destination information 530, and validation information 540. VCID field 510 contains information that specifies a virtual circuit register contained within a UM or CM. The virtual circuit register points to or addresses a queue control block which in turn points to read and write packet descriptors which can point to an additional packet descriptor, as well as to read and write buffer descriptors. The buffer descriptors each point to a write buffer and to a next read and write buffer descriptor, thereby forming a link list of addresses for defining which buffer location the data field 408 of a received transmission packet 400 will be stored. The packet length field 520 provides information concerning the length of the associated packet. The destination information field 530 includes destination device address information for a UM 12 or a CM 10. The validation information field 540 contains data associated with a Cyclic Redundancy Check (CRC) data accuracy calculation.

Figure 6:
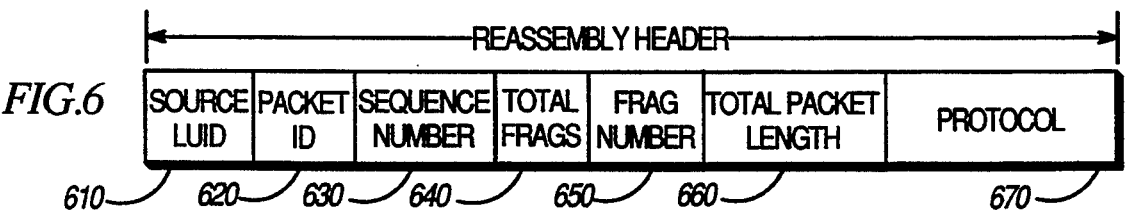
FIG. 6 illustrates the information contained in the reassembly header as shown in FIG. 4.

FIG. 6 illustrates information contained within the reassembly header of the transmission packet of FIG. 4. By design it includes a source logical unit identification (LUID) field 610, packet identification field 620, sequence number field 630, total fragment field 640, fragment number field 650, total packet length field 660 and a protocol field 670. The Source LUID field 610 defines the logical unit identification of a UM 12. In accordance with the preferred embodiment, Source LUID is assigned by CM 10 to each UM 12 within the CM 10 zone of service. The protocol field 670 is used in part by the microprocessor 13 of FIG. 1 to maintain proper data packet ordering upon data stream recovery as described herein below. Since the Source LUID field 610 and the protocol field 670 are the only fields within the Reassembly Header of importance to the present invention, discussion of the remaining fields will not be presented at this time.

Figure 7:
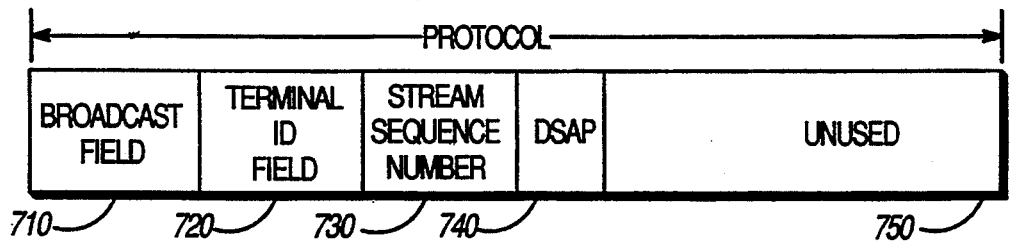
FIG. 7 illustrates the information contained in the protocol field as shown in FIG. 6.

FIG. 7 illustrates the information contained in the protocol field of a reassembly packet as shown in FIG. 6. As depicted, the protocol field comprises broadcast field 710, terminal ID field 720, data stream sequence number 730, and Destination Service Access Point (DSAP) field 740. Additional fields 750 are reserved for future use.

The broadcast field 710 is used in CM to UM transmission. When the received packet is of a broadcast type, the broad cast field will be set to a logic one, otherwise it is a logic zero, identifying it as a non-broadcast type packet. Broadcast type packets are received and processed by all terminals devices 14 within the zone of coverage as established by CM 10. Non-broadcast type packets, on the other hand, are for receipt by a specifically identified terminal 14 within the CM 10 zone of coverage.

The terminal ID field 720 stores a value assigned by a servicing UM 12 when it receives, for the first time, a data packet from a newly installed terminal device 14. Thereafter, the terminal device 14 is identified by this terminal ID.

The stream sequence number field 730 stores a number used by UMs 12 and CM 10 alike, to sequence received data packets thereby preserving their sequential relationship with respect to a common point of origin. It will be appreciated that this field size can be any number of bits, n, necessary to provide this functionality. In accordance with the preferred embodiment, the stream sequence number field 730 is an n bit field which provides for a range of $2^n$ sequence numbers. In accordance with the preferred embodiment n is 6, thereby providing for a range of sequence number from 0–63.

The DSAP field 740 indicates whether the received packet is destined for a system service or LAN application. This enables proper routing of each received packet to the correct application for further processing.

The remainder of this discussion is directed at how the UMs 12 and CM 10 of FIG. 1, under the control of microprocessor 13 and direction of program instruction sets stored in ROM 15 of FIG. 2, in conjunction with information stored in the fields of FIGS. 4–7, perform those tasks associated with the identification and preservation of the sequential relationship of common point of origin data packets 310 that are found within an original data stream 300 of FIG. 3, despite the introduction of ordering errors due to their subsequent radio transmission.

Figures 8, 9:
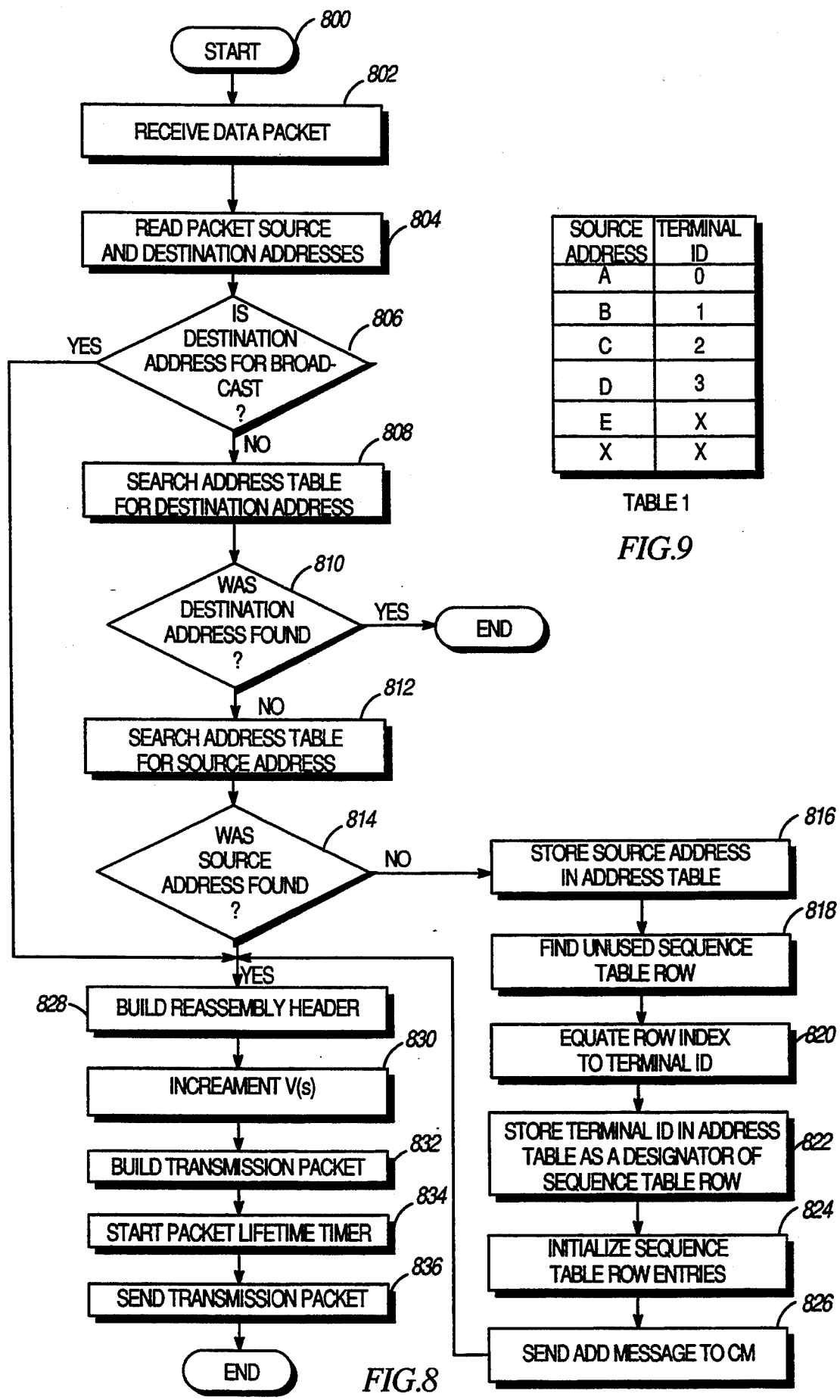
FIG. 8 is a flow chart diagram of the steps performed by microprocessor 13 of FIG. 2 when UM 12 receives a data packet from user devices 14.
FIG. 9 illustrates a UM 12 Address Table.

FIG. 8 is a flow chart of the steps performed by microprocessor 13 when UMs 12 receive a data packet 310 from terminal devices 14. Commencing with start block 800, flow proceeds to block 802 whenever UM 12 receives a data packet 310. From block 802, flow proceeds to block 804 where the source address and the destination address within the packet 310 are read. In accordance with the preferred embodiment, the source address is the unique IEEE Ethernet address assigned to the source terminal device 14. The destination address is the IEEE Ethernet address of the device which is to receive the packet 310.

Flow proceeds to decision block 806 where a bit status check is performed to see whether the received packet is to be transmitted as a broadcast type packet (broadcasted to all UMs serviced by CM 10) or not. Assuming it is, flow proceeds to block 828 where the reassembly header of FIGS. 4 and 6 is constructed.

If the packet is a non-broadcast type packet, flow proceeds from block 806 to block 808 where an address table in RAM 17 which maintains entries for each of the terminals 14 connected to UM 12 is searched for the received packet's destination address. At decision block 810 a check is made to see whether the destination address was found. If it is, the packet is discarded and program flow stops because the destination device is assumed to be connected to the UM and capable of receiving the packet over the wire 16.

If the destination device address is not found, flow proceeds to block 812, where the address table in RAM 17 is searched for the terminal devices source address. Next, at decision block 814, a check is performed to determine whether the source address was found in the RAM 17 address table. If so, flow proceeds to block 828 where the reassembly header of FIGS. 4 and 6 is constructed. If not, then a new entry must be made in the RAM 17 address table to identify this terminal device 14 previously unknown to the UM 12.

Flow proceeds to block 816 where the packet source address is stored in the RAM 17 address table, hereinafter referred to as Table 1 and depicted in FIG. 9. FIG. 9 illustrates storage of source addresses in a source address field as well as the storage of a Terminal ID in a Terminal ID field. As previously discussed, source addresses are read from received packets. Thus, the new terminal address, E, is shown stored in Table 1. Terminal IDs are assigned as discussed below.

Referring back to FIG. 8, flow proceeds from block 816 to block 818, where the microprocessor 13 of FIG.

Figures 10, 11, 12:
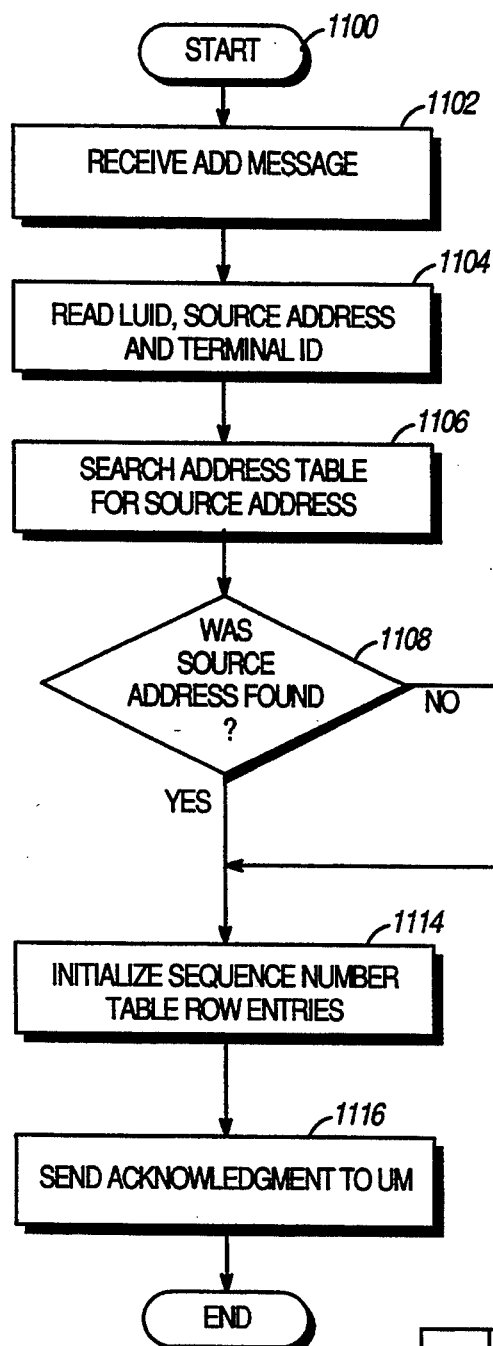
FIG. 10 illustrates a Packet Sequence Number Table.
FIG. 11 is a flow chart diagram of the steps performed by microprocessor 13 of FIG. 2 when CM 10 receives an ADD MESSAGE command from UM 12.
FIG. 12 illustrates a CM 10 Address Table.

1 examines a RAM 17 Sequence Number Table for an unused row of entries. The Sequence Number Table, hereinafter referred to as Table 2, is depicted in FIG. 10. Referring to FIG. 10, it will be appreciated that row 4 of Table 2 is the next unused row. Therefore, at blocks 820 and 822 of FIG. 8, the Table 2 row index number, 4, is written into the Terminal Id field associated with the source address E, thereby providing a pointer from the Source Address Table 1 into the Sequence Number Table 2. Hereafter, Table 2, row 4 is utilized to track the sequence number of data packets as received from user device E.

This is accomplished by updating the entries as depicted in Table 2. Referring to FIG. 10, Table 2 comprises the following sequence information entries: V(s), Lower Window Bound, Tx Window Map, V(r), Rx Window Map, and Rx Window Queue Pointer. Collectively, these table entries contain the necessary information for preserving packet ordering of both transmit and receive data streams associated with a specific Terminal ID. The purpose and definition of each of these entries is as follows.

V(s) is the transmit sequence number (0−N) that will be assigned to the next transmission packet associated with a user device stream.

Lower Window Bound is the sequence number value assigned to the oldest unacknowledged transmission packet in the particular device stream. When there are no unacknowledged packets outstanding, this field should equal V(s).

Tx Window Map is a bit-mapped structure used to manage the Transmit Window when packets are acknowledged out of order. If a packet in the device stream is acknowledged and its stream sequence number is greater than the Lower Window Bound, a bit is set in the map structure which corresponds to the packet's sequence number relative to the Lower Window Bound. When the packet corresponding to Lower Window Bound is finally acknowledged or times out, the map structure is used to determine how far to advance the Lower Window Bound.

V(r) is the sequence number (0–63) expected in the next packet received for a specific terminal ID. If a packet arrives for this terminal ID and its sequence number is not equal V(r), the packet will be queued as long as it is within the valid receive window extending from $V(r)+1$ to $V(r)+(2^{n-2}-1)$.

Rx Window Map is a bit-mapped structure used to manage the Receive Window when packets are received out of order. If a packet is received whose sequence number is not V(r) but is nonetheless within the valid receive window, a bit is set in the map structure which corresponds to the packet's sequence number relative to V(r). Such a packet will be queued for transmission to the LAN application. When the packet corresponding to V(r) arrives or times out, the map structure is used to determine how far to advance V(r).

Rx Window Queue Pointer is a pointer to a linked list of received packets that are queued for later transmission. Packets are inserted into this queue in order of sequence number.

In accordance with the present invention, out of order packets are handled in the following manner:

1). If the sequence number N(r) of a received packet is within the range from $V(r)+1$ to $V(r)+(2^{n-2}-1)$, the packet is inserted into the RX window queue and the appropriate bit is set in the RX window Map.

2). If the sequence number N(r) of a received packet is in the range from $V(r)+(2^{n-2})$ to $V(r)+(2^{-1}-1)$ and the RX window queue is empty, V(r) is advanced to $N(r)+1$, and the packet is delivered.

3). Under all other circumstances, the packet is dropped.

Referring back to FIG. 8, flow proceeds from block 822 to block 824 where the newly assigned row 4 in Table 2 is initialized. Thereafter, at block 826, the UM is instructed to send an ADD MESSAGE to the CM 10 in order to prepare the CM to receive packets from the newly identified terminal device having a source address of E.

Next flow proceeds to block 828, where the reassembly header of FIGS. 4 and 6 is constructed for the received packet. In accordance with the preferred embodiment, the UM 12 LUID is placed into the Source LUID field 610 of FIG. 6 in order to identify which UM 12 transmitted the packet. Within the Protocol Field of FIG. 7, the broadcast field 710 status is set based upon the decision at block 806. The Terminal ID field 720 is given the appropriate Terminal ID from Table 1. The Stream Sequence Number field 730 or N(s) receives the current value of V(s) as stored in Table 2. Finally the DSAP field 740 status is set according to whether the packet, upon receipt is to be processed by the receiving device, CM 10, or is instead to be routed to the Packet Data Network 18 for further processing.

Next at block 830, the value of V(s) as stored in Table 2 is incremented. Flow then proceeds to block 832 where a transmission packet 400 as depicted in FIG. 4 is constructed. At block 834, a transmission lifetime timer is started and the transmission packet 400 is transmitted to the CM 10 at block 836.

Referring next to FIG. 11, a flow chart diagram of the steps performed by microprocessor 13 of CM 10 in response to the receipt of an ADD MESSAGE in accordance with step 826 of FIG. 8 is shown. The typical ADD MESSAGE transmitted by UM 12 comprises the UM 12 LUID, the new terminal device 14 Source Address and the Terminal ID as assigned by the transmitting UM 12 for the newly encountered terminal device 14.

Commencing with start block 1100, flow proceeds to block 1102 where the CM 10 receives an ADD MESSAGE. Flow proceeds to block 1104 where the UM LUID, Source Address and Terminal ID are read. Next, at block 1106, a RAM 17 address table, shown in FIG. 12 and hereinafter referred to as Table 3, is searched for the terminal device 14 Source Address.

At decision block 1108 a check is performed to determine whether the Source Address was found. Assuming it was not found, flow proceeds to block 1110 where the Source Address, Terminal ID and LUID are stored in Table 3 in order to register the new terminal device 14 identified by the Source Address, Terminal ID and LUID received in the ADD MESSAGE at block 1102. Thereafter, at block 1112 the Terminal ID is used to index into a Sequence Number Table stored in RAM 17 of CM 10. The CM 10 Sequence Number Table is identical to Table 2 as previously described in association with FIG. 10. In accordance, each Table 2 row comprises the following entries: V(s), Lower Window Bound, Tx Window Map, V(r), Rx Window Map, and Rx Window Queue Pointer, which collectively contain the information necessary for preserving packet ordering of both transmit and receive data streams as a function of Source Address, LUID and Terminal ID.

Flow proceeds from block 1112 to block 1114 where the indexed Table 2 row is initialized. At block 1116 receipt of the ADD MESSAGE is acknowledged.

Figure 13:
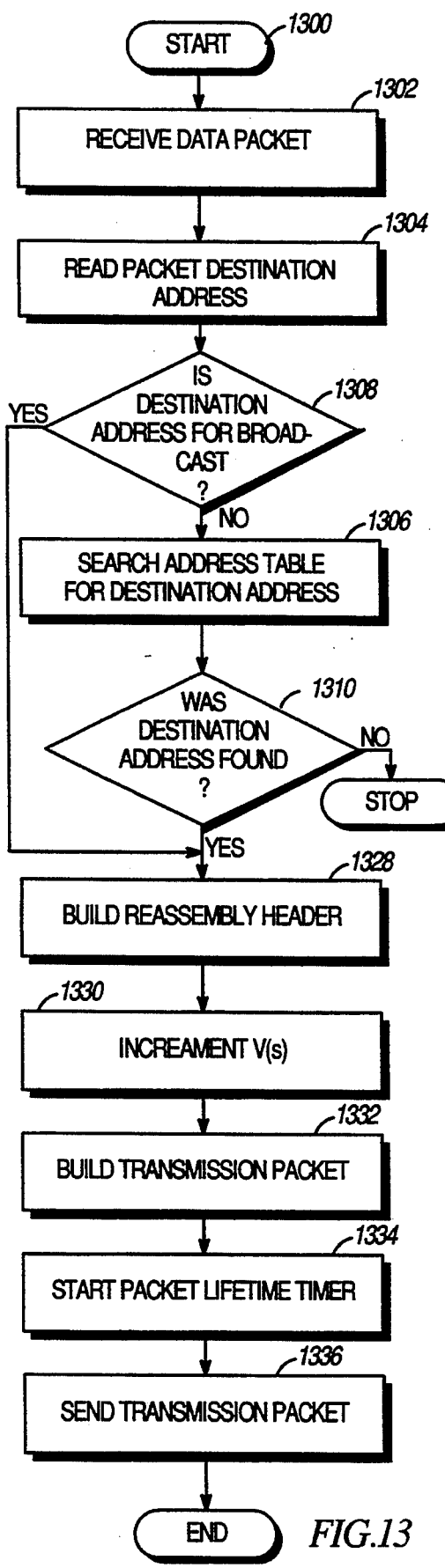
FIG. 13 is a flow chart diagram of the steps performed by microprocessor 13 of FIG. 2 when CM 10 receives a data packet from packet data network 18.

FIG. 13 depicts a flow chart diagram of the steps performed by the microprocessor 13 of FIG. 2 when a CM 10 receives a data packet from the packet data network 18. Commencing with start block 1300, flow proceeds to block 1302 whenever CM 10 receives a data packet 310 from the packet data network 18 of FIG. 1. From block 1302, flow proceeds to block 1304 where the Destination Address within the packet 310 is read. In accordance with the preferred embodiment, the Destination Address is the IEEE Ethernet address of the device which is to receive the packet 310.

Flow proceeds to decision block 1306 where a bit status check is performed to see whether the received packet is to be transmitted as a broadcast type packet, i.e., received and stored by all UMs serviced by CM 10, or not. Assuming it is, flow proceeds to block 1328 where a reassembly header is constructed in accordance with the description of step 828 of FIG. 8.

If the packet is a non-broadcast type packet, flow proceeds from block 1306 to block 1308 where the Address or Table 3 of CM 10 is searched for the packet's Destination Address.

At decision block 1310 a check is performed to determine whether the Destination Address was found. Assuming it is not, the packet is discarded and program flow stops because the destination device is either unknown or assumed to be connected to the channel 20 and capable of receiving the packet without CM 10 intervention. If the destination Device Address is found, however, flow proceeds to block 1328, where the reassembly header of FIGS. 4 and 6 is constructed in accordance with the description of step 828 of FIG. 8.

Next at block 1330, the value of V(s) as stored in the Sequence Number Table or Table 2 of CM 10 is incremented. Flow then proceeds to block 1332 where a transmission packet 400 as depicted in FIG. 4 is constructed. At block 1334, a transmission packet lifetime timer is started and the transmission packet 400 is transmitted to the UM 12 at block 1336.

Figure 14:
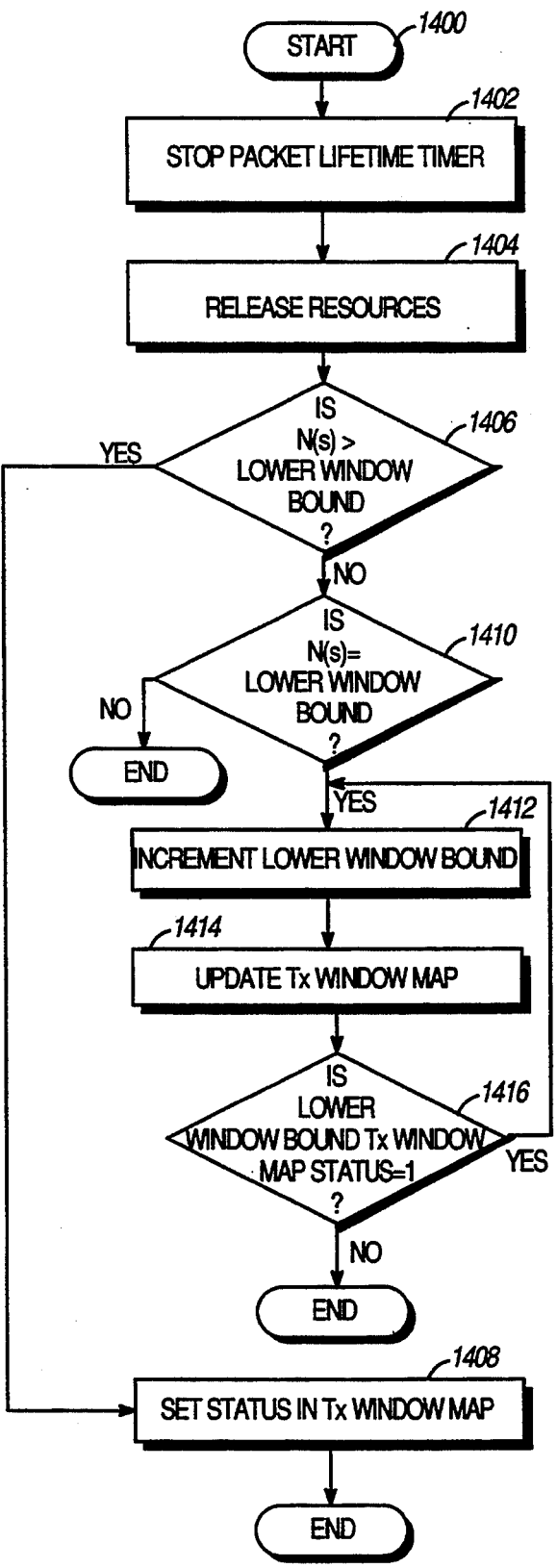
FIG. 14 is a flow chart diagram of the steps performed by microprocessor 13 of FIG. 2 upon receipt by CM 10 or UM 12 of transmission acknowledgment or expiration of the transmission packet lifetime timer.

Referring next to FIG. 14 a flow chart diagram of the steps performed by the microprocessor 13 of CM 10 or the microprocessor 13 of UM 12 upon receipt of an indication that a transmission has been successfully completed or upon receipt of an indication that a transmission was not successfully completed within the time prescribed by the packet lifetime timer.

Commencing at start block 1400, flow proceeds to block 1402 where the packet lifetime timer is stopped. Flow proceeds to block 1404 where all memory resources reserved for tracking the packet are surrendered. Next, at decision block 1406 a check is performed to determine whether the sequence number N(s) is greater than the lower bound. If so, flow proceeds to block 1408 where the appropriate bit in the transmit window (Tx window) bit map is set in order to indicate that the transmission process for this packet is finished. Thereafter, the process flow ends.

If N(s) is not greater than the lower window bound, flow proceeds from decision block 1406 to decision block 1410, where a check is performed to determine whether N(s) is equal to the lower window bound. If it is not, an erroneous update is assumed and the process flow ends. If, however, N(s) is equal to the lower window bound, flow proceeds to block 1412 and 1414 where the Lower Window Bound is incremented and the Tx window bit map is updated to indicate the change in the Lower Window bound. Thereafter, flow proceeds to decision block 1416 where a check is performed to determine whether the Tx Window Map bit status indexed by the Lower Window bound is equal to 1 (set). If not, the flow process ends, because the Lower Window Bound is assumed to be pointing to the oldest unacknowledged packet in the transmission stream. If, however, the Tx Window Map bit status indexed by the Lower Window bound is equal to 1, flow branches back to block 1414 where the process repeats itself until the Lower Window bound again points to the oldest unacknowledged packet in the transmission data stream.

Figure 15:
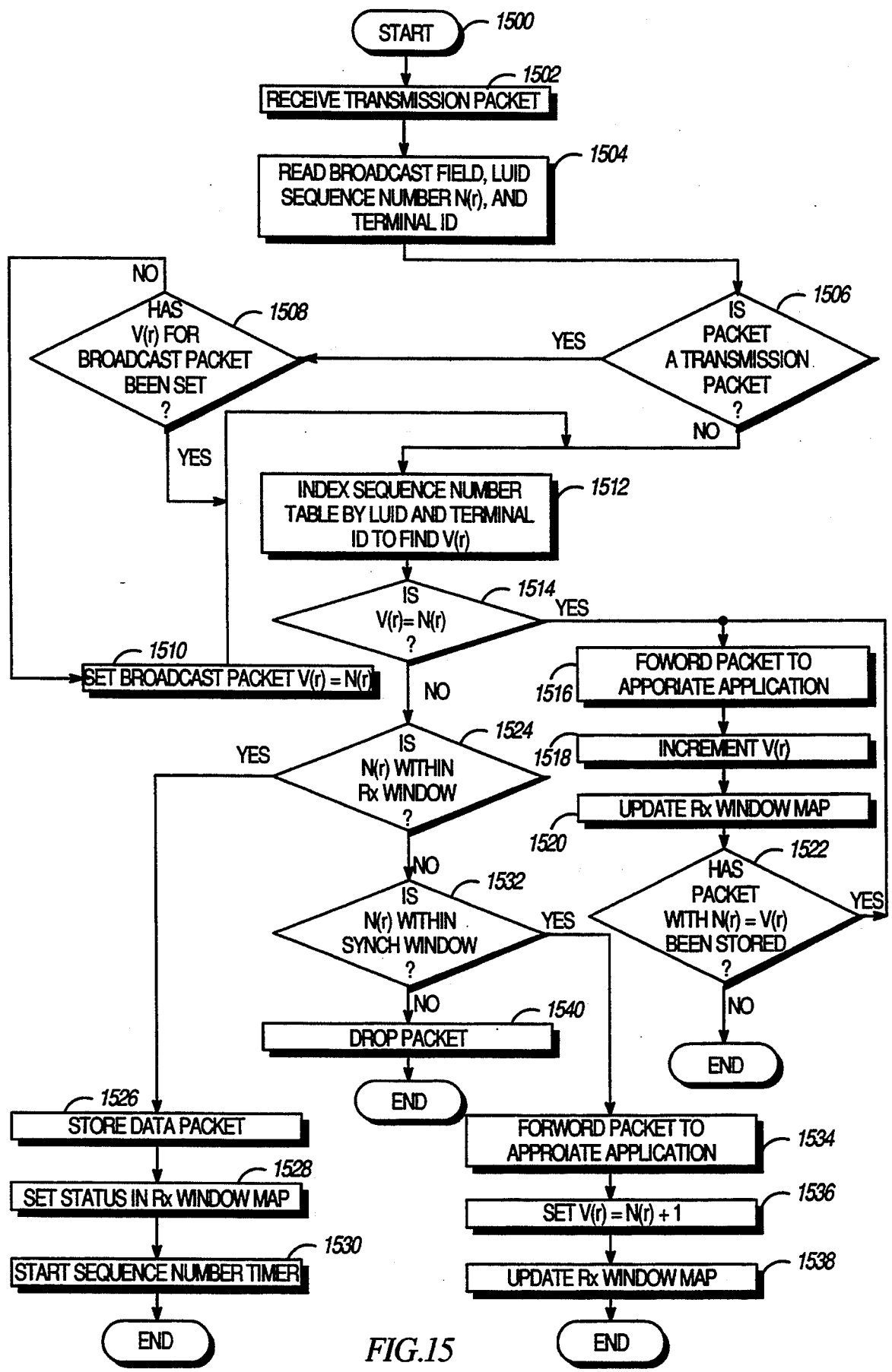
FIG. 15 is a flow chart diagram of the steps performed by microprocessor 13 of CM 10 or UM 12 upon receipt of a transmission packet.

Referring next to FIG. 15 a flow chart diagram of the steps performed by the microprocessor 13 of CM 10 or the microprocessor 13 of UM 12 upon receipt of a transmission packet 400 are shown. Commencing at start block 1500, flow proceeds to block 1502 upon receipt of a transmission packet 400. Next, at block 1504, the UM 12 LUID, i.e., Source LUID 610 of FIG. 6, Broadcast Field 710 status, Terminal ID field 720 and Stream Sequence Number 730 of FIG. 7 are read. At decision block 1506 a check is performed with the Broadcast Field status to determine whether the received transmission packet 400 is a broadcast type packet. Assuming it is, flow proceeds to decision block 1508 where a check is performed to determine whether this is the first broadcast type packet received by UM 12 or CM 10. If so, at block 1510, the Sequence Number value, V(r), in Table 2 at a row reserved specifically for tracking broadcast type packets is set to N(r), the sequence number value of the first broadcast type transmission packet received.

Assuming the received transmission packet is not a broadcast type packet or that the received transmission is not the first broadcast type packet received by UM 12 or CM 10, flow proceeds to block 1512 where the Table 2 is searched to find the packet's expected sequence number V(r) by indexing Table 2 by Source LUID and Terminal ID.

At decision block 1514 a check is performed to determine whether the expectant sequence number value V(r), is equal to the sequence number N(r) as received and read at blocks 1502 and 1504. If V(r)=N(r), the transmission packet 400 was received in proper order. Consequently, flow proceeds to block 1516, where the data within the received transmission packet 400 is forwarded to the appropriate application in accordance with instructions within the DSAP field 740 as described in connection with FIG. 7. Thereafter, at step 1518, the value of V(r) in Table 2 is incremented to indicate the expected sequence number of the next transmission packet to be received. At block 1520 the receive (RX) window bit map is updated to indicate receipt of the transmission packet.

Flow then proceeds to decision block 1522 where a check is performed to determine whether any previously received and out of order packets may now be routed to the appropriate application. In this effort, a check is performed to determine whether any previously received packets associated with the stream identified by Source LUID and Terminal ID having a sequence number equal to the incremented value of V(r) as determined at block 1518 are currently stored in memory. If so, flow branches back to block 1516 where the process is repeated until no such out of order packet remain stored in memory. At such time, the process flow ends in preparation for receipt of a next transmission packet 400.

Turning our attention back to block 1514, if the expected sequence number V(r) is not equal to sequence number N(r) of transmission packet 400, flow proceeds to decision block 1524 where a test is performed to determine whether the value of the sequence number N(r) is within a range of values delimited by a receive window (Rx window). In accordance with the present invention, the sequence number range is from 0 to $2^n-1$, where n is the number of bits used to encode the sequence number. In accordance with the preferred embodiment, n is equal to 6, thus the sequence number range is from 0 to 63. Within this range, the Rx window_size is 16 consecutive sequence numbers defined as V(r) plus the next 15 consecutive sequence numbers.

N(r) is within the Rx window when N(r) is greater than V(r) and when N(r) is less than V(r)+Rx window_size. Thus, N(r) is within the Rx window range when N(r) is between V(r)+1 to V(r)+$(2^{n-2}-1)$. Under these conditions, flow proceeds to block 1526 where the data associated with the packet is stored in memory, under the direction of the Rx window queue pointer, in the order as determined by its sequence number N (r). The Rx window bit map is updated at block 1528 to document storage of the received packet, and a sequence number timer is started at block 1530 to provide time out protection.

Turning back to block 1524, when the value of the sequence number N(r) is not within the range of values defined by the Rx window, flow proceeds to decision block 1532, where a check is performed to determine whether the value of the sequence number N(r) is within a range of values defined by a Synchronization window (SYNCH window). In accordance with the present invention, the SYNCH window comprises the next consecutive 16 bits following the Rx window. N(r) is greater than or equal to V(r)+window_size and when N(r) deemed to be within the SYNCH window when N(r) is greater than or equal to V(r)+window_size and when N(r) is less than V(r)+2*(Rx window_size) and when the Rx window bit map is empty. Thus, N(r) is deemed within the SYNCH window when N(r) is between V(r)+$(2^{n-2})$ to V(r)+$(2^{n-1}-1)$. Under these conditions, it is assumed that all data packets comprising the current Rx window were lost, indicating that the CM 10 and the UM 12 Tx Windows and Rx Windows are no longer synchronized. It will be appreciated by those skilled in the art that this condition may occur because the present invention does not require the exchange of Rx and Tx Window status information between CM 10 and the UM 12.

In order to resynchronize, flow proceeds to block 1534 where the data associated with the last received transmission packet is forwarded to the appropriate application. Thereafter, the value V(r) in Table 2 is set to N(r)+1 at step 1536, the RX window bit map is updated at step 1538 to reflect the resynchronization of the expected sequence value V(r) to that of the next sequence number to be received, N(r)+1, and the process flow ends in preparation of receipt of a new transmission packet.

In all other circumstances, the packet will be treated as either unrecognized or a repeated packet, in which case it will be dropped and process flow will cease at step 1540.

Figure 16:
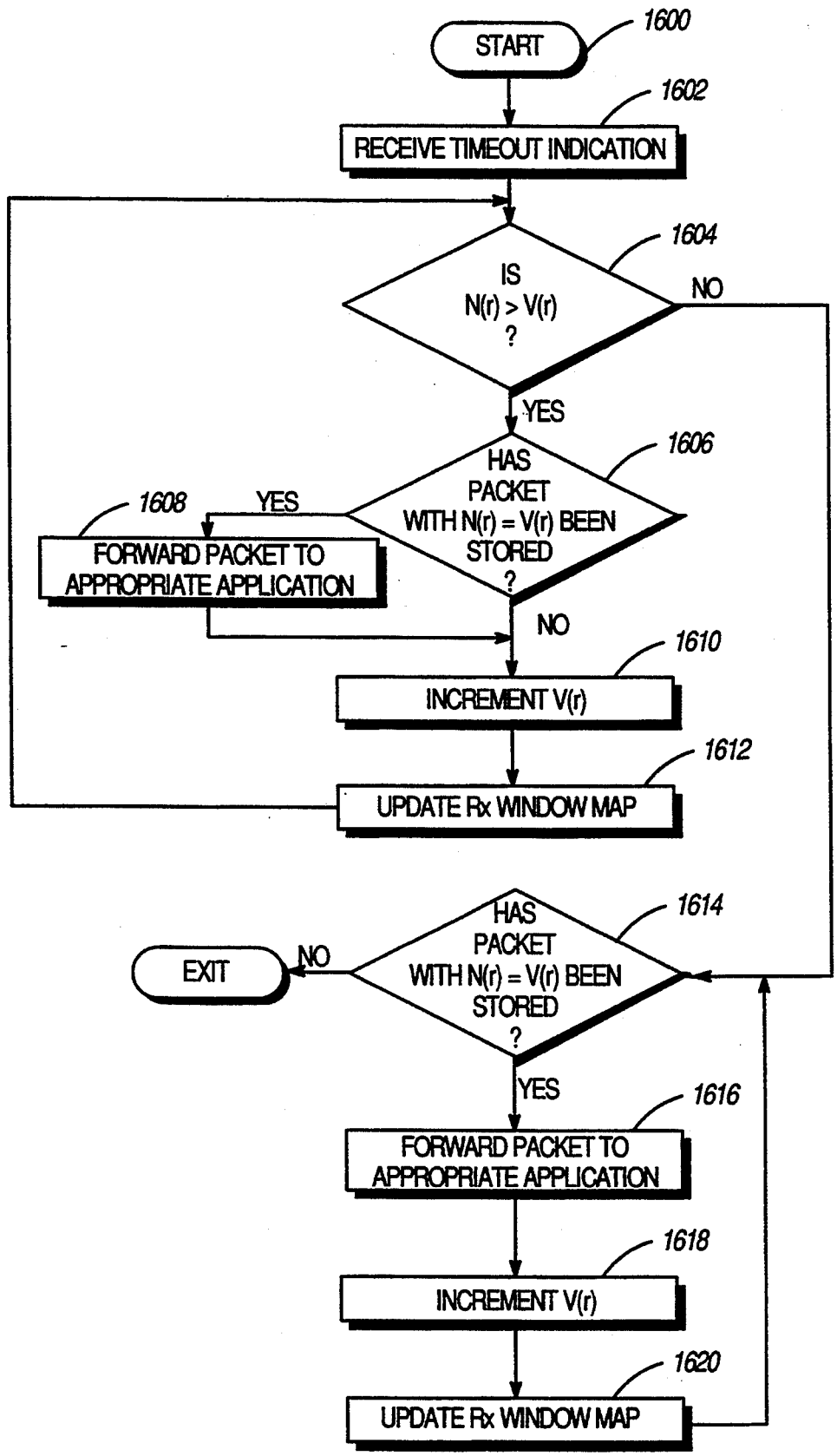
FIG. 16 is a flow chart diagram of the steps performed by microprocessor 13 of FIG. 2 upon expiration of the sequence timer.

Referring next to FIG. 16, a flow chart diagram of the steps performed by microprocessor 13 of UM 12 or CM 10 upon the expiration of sequence number time out at step 1530 of FIG. 15. Commencing at start block 1600, flow proceeds to block 1602 upon receipt of a time out indication. After such indication, flow proceeds to decision block 1604 where a test is performed to determine whether the sequence number N(r) for the timed out packet is greater than the the expected sequence number V(r) as indexed by the status of the Rx Window Map at step 1528 of FIG. 15. If so, flow proceeds to decision block 1606 where a test is performed to determine whether any previously received and out of order packets may now be routed to an appropriate application. If so, flow proceeds to block 1608. If not, flow proceeds to block 1610 where V(r) is incremented, the Rx Window Map is updated at block 1612, and flow branches back to decision block 1604 where the process repeats until N(r) is equal to V(r), at which point flow proceeds to decision block 1614. At decision block 1614, a test is performed to determine whether any previously received and out of order packets may now be routed to the appropriate application for processing. If so, the data packet is forwarded at block 1616, V(r) is incremented at 1618, the Rx Window Map is updated at 1620 and flow branches back to block 1614 where the process repeats until all previously received packets are forwarded.

What is claimed is:

1. A method, for in a packet transmission system, for preserving the sequential relationship of a data stream of data packets generated by a plurality of source devices and communicated between a first terminal and a second terminal over channels which introduce ordering errors, comprising the steps of:

at said first terminal;

identifying data packets from within the data stream as a function of source device identification information;

generating data packet sequence information for the identified data packets;

storing in first terminal memory, values corresponding to data packet sequence information, indexed as a function of source device identification; and transmitting first terminal transmissions comprising data packets, source device identification information and packet sequence information to said second terminal having first terminal source device and data packet sequence information;

at said second terminal;

receiving said first terminal transmissions;

fetching from second terminal memory, first terminal data packet sequence information when addressed by first terminal source device identification information;

comparing fetched data packet sequence information with received data packet sequence information;

forwarding a received data packet for further processing when the sequence information sequence numbers match; and storing at least some of the received data packets in second terminal memory in an order determined by the sequence information when the sequence information sequence numbers do not match.

2. The method according to claim 1 further comprising the steps of:

identifying, at said first terminal, said plurality of source devices;

transmitting to said second terminal, first terminal source device identification information on each one of said plurality of source devices, prior to transmission of data packets from said each one of said plurality of source devices, respectively;

feeding second terminal memory with first terminal source device identification information as a memory address signal;

mapping tables in second terminal memory for storage of first terminal source device and data packet sequence information as a function of the memory address signals; and intializing the second terminal memory mapped tables, prior to the receipt of a first terminal transmission having source device identification information which addresses the initialized memory table.

3. The method of claim 1 further comprising the steps of:

determining when a received transmission is to be communicated to all source devices connected to a terminal; and synchronizing the sequence number information for that received transmission with the sequence number information maintained by the packet transmission system when a transmission is to be communicated to all source devices has not previously been received.

4. The method of claim 1 wherein the step of generating packet sequence information further comprises the steps of:

tracking data packet sequencing; and commencing a packet timer upon queuing the transmission packet for transmission.

5. The method of claim 4 wherein upon an indication of a packet timer time out a transmit window bit map status is updated to determine an oldest unacknowledged transmission packet.

6. The method of claim 1 wherein the step of forwarding a received data packet for further processing further comprises the steps of:

forwarding the data packet to an appropriate application for further handling;

updating a receive window bit map status to indicate receipt of said data packet; and determining whether any previously received and out of order data packets are to be forwarded to the appropriate application.

7. The method of claim 1 wherein the step of storing at least some of the received data packets further comprises the steps of:

storing a received data packet when the sequence information sequence numbers match within a range from $V(r+1$ to $V(r)+(2^{n-2}-1)$, where $V(r)$ is a value representing an anticipated sequence number for the received data packet and n is a number of bits used to encode that sequence number value $V(r)$;

updating a bit map status to indicate receipt of said data packet; and commencing a timer.

8. The method of claim 7 wherein upon indication of a timer time out, the stored data packets are forwarded to an appropriate application in an order as determined by sequence number.

9. The method of claim 1 further comprises the step of: discarding the received data packet when the sequence information sequence numbers do not match by more than $V(r)+(2^{n-1})$, where $V(r)$ is a value representing an anticipated sequence number for the received data packet and $n$ is a number of bits used to encode that sequence number value $V(r)$.

10. The method of claim 1 further comprising the steps of:

forwarding a received data packet for further processing when the sequence information sequences numbers match within a range from $V(r)+(2^{n-2})$ to $V(r)+(2^{n-1}-1)$ where $V(r)$ is a value representing an anticipated sequence number for the received data packet and n is a number of bits used to encode that sequence number value $V(r)$;

updating a bit map status to indicate receipt of said data packet; and synchronizing the sequence number information within the second terminal memory map with the sequence number information within the received packet.

11. A communication system controller for use with a general purpose microprocessor, said controller comprising:

a computer program storage medium having a computer program stored thereon for execution by said microprocessor to preserve the sequential relationship of a data stream of data packets generated by a plurality of source devices and communicated between a first terminal and a second terminal, said program comprising:

at said first terminal;

means for identifying data packets from within the data stream as a function of source device identification information;

means for generating data packet sequence information for identified data packets;

a first random access memory, associated with the identifying means and the generating means;

means for feeding to said first memory, source device identification information, as an address signal;

means for storing in said first memory, values corresponding to data packet sequence information, indexed by source device identification information; and a transmitter, coupled to the first random access memory, for transmitting first terminal transmissions comprising data packets, source device identification information and data packet sequence information to said second terminal;

at said second terminal;

a receiver for receiving said first terminal transmissions;

a second random access memory, coupled to the receiver, having first terminal source device and data packet sequence information;

means, coupled to the second memory, for fetching first terminal data packet sequence information from the second memory when said second memory is addressed by received source device identification information;

means for comparing the fetched data packet sequence information sequence number with received data packet sequence information sequence number;

means, responsive to the comparison, for forwarding a received data packet for further processing when sequence information sequence numbers match; storing the received data packet when the sequence information sequence numbers match within a range from $V(r)+1$ to $V(r)+(2^{n-2}-1)$; forwarding the received data packet for further processing when the sequence information sequence numbers match within a range from $V(r)+(2^{n-2})$ to $V(r)+(2^{n-1}-1)$; and discarding the received data packet when the sequence information sequence numbers do not match by more than $V(r)+(2^{n-1})$ where $V(r)$ is a value representing an anticipated sequence number for the received data packet and n is a number of bits used to encode that sequence number value $V(r)$.

12. The communication system controller of claim 11 wherein said program further comprises:
   means for identifying said plurality of first terminal source devices;
   means for transmitting to said second terminal, first terminal source device identification information on each one of said plurality of source devices, prior to transmission of data packets from said each one of said plurality of source devices, respectively;
   means for feeding second terminal memory with first terminal source device identification information as a memory address signal;
   means for mapping tables in second terminal memory for storage of first terminal source device and packet sequence number information as a function of the memory address signals; and
   means for initializing a second terminal memory mapped table, prior to the receipt of a first terminal transmission having source device identification information which addresses the initialized memory table.

13. The communication system controller of claim 11 wherein said program further comprises:
   means for determining when a received transmission is to be communicated to all source devices connected to a terminal; and
   means for synchronizing the sequence number information for that received transmission with the sequence number information maintained by the system when a transmission is to be communicated to all source devices has not previously been received.

14. The communication system controller of claim 11 wherein said program further comprises:
   means for tracking data packet sequencing;
   means for building a transmission packet reassembly header;
   means for building a transmission packet; and
   means for commencing a packet timer upon queuing the transmission packet for transmission.

15. The communication system controller of claim 14 wherein upon an indication of a packet timer time out a transmit window bit map status is updated to determine an oldest unacknowledged transmission packet.

16. The communication system controller of claim 11 wherein the means for forwarding a received data packet for further processing when sequence information sequence numbers compare further comprises:
   means for forwarding the data packet to an appropriate application for further handling;
   means for updating a receive window bit map status to indicate receipt of said data packet; and
   means for determining whether any previously received and out of order data packets are to be forwarded to the appropriate application.

17. The communication system controller of claim 11 wherein the means for storing the received data packet when the sequence information sequence numbers match within a range from $V(r)+1$ to $V(r)+(2^{n-2}-1)$, further comprises:
   means for storing the received data packet in memory in an order as determined by the data packet sequence information;
   means for updating a receive window bit map status to indicate receipt of said data packet; and
   means for commencing a sequence number timer.

18. The communication system controller of claim 17 wherein wherein upon identification of a sequence number time out the stored data packet is forwarded to an appropriate application.

19. The communication system controller of claim 11 wherein the means for forwarding a received data packet for further processing when the sequence information sequence numbers match within a range from $V(r)+(2^{n-2})$ to $V(r)+(2^{n-1}-1)$ further comprises:
   means for forwarding the data packet to an appropriate application for further handling;
   means for updating receive window bit map status to indicate receipt of said data packets; and
   means for synchronizing the sequence number information within the second terminal memory map with the sequence number information within the received transmission.

20. The communication system controller of claim 11 wherein said data packet sequence information comprises:
   source device identification information;
   a transmit sequence number assigned to the next transmission packet associated with a source device;
   a sequence number value assigned to an oldest unacknowledged transmission packet associated with a source device;
   a transmit window bit-map to manage packets acknowledged out of order;
   a receive sequence number, stored in memory, and representative of the sequence number for a packet next expected to be received; and
   a receive window bit map to manage packets received out of order.

21. An RF communication system for preserving the sequential relationship of a data stream of data packets generated by a plurality of source devices and communicated between a first terminal and a second terminal, said communication system comprising:
   said first terminal including:
      a microprocessor for identifying said plurality of source devices, identifying data packets from within the data stream as a function of source and generating data packet sequence numbers for identified data packets;
      random access memory, coupled to the microprocessor, for storing a table of values corresponding to data packet sequence numbers as a function of source device identification;
      a transmitter, controlled by the microprocessor and coupled to the random access memory, for transmitting data packets, source device identity and packet sequence numbers to said second terminal having first terminal source device and data packet sequence number information;
   said second terminal including:
      a receiver for receiving first terminal transmissions;
      random access memory, coupled to the receiver, for storing a table values corresponding to first terminal data packet sequence number information; and a microprocessor, coupled to the receiver and random access memory, for fetching first terminal data packet sequence number information from random access memory when random access memory is addressed by source device identification, comparing the fetched data packet sequence number with a received data packet sequence number, forwarding a received data packet to an application for further processing when sequence information sequence numbers match, storing the received data packet when the sequence information sequence numbers match within a range from $V(r)+1$ to $V(r)+(2^{n-2}-1)$, forwarding a received data packet to an application for further processing when the sequence information sequence numbers match within a range from $V(r)+(2^{n-2})$ to $V(r)+(2^{n-1}-1)$; and discarding the received data packet when the sequence information sequence numbers do not match by more than $V(r)+(2^{n-1})$, where $V(r)$ is a value representing an anticipated sequence number for the received data packet and n is a number of bits used to encode that sequence number value $V(r)$.

* * * * *

UNITED STATES PATENT AND TRADEMARK OFFICE
CERTIFICATE OF CORRECTION

PATENT NO. : 5,337,313
DATED : August 9, 1994
INVENTOR(S) : Dale R. Buchholz; William K. Doss; Karen E. Robbins; R. Lee Hamilton, Jr.

It is certified that error appears in the above-identified patent and that said Letters Patent is hereby corrected as shown below:

The Title reads "METHOD AND APPARATUS FOR PRESERVING PACKET SQUENCING IN A PACKET TRANSMISSION SYSTEM" -- the Title should read "METHOD AND APPARATUS FOR PRESERVING PACKET SEQUENCING IN A PACKET TRANSMISSION SYSTEM"

Column 12, line 28 reads "for in a" --should read "for use in a"

Column 13, line 52 reads "V(r+1 to V(r)" -- should be "V(r)+1 to V(r)"

Column 14, line 6 reads "information sequences" -- should be "information sequence"

Signed and Sealed this

Twenty-first Day of May, 1996

Attest:

BRUCE LEHMAN

Attesting Officer          Commissioner of Patents and Trademarks